Figure 1:
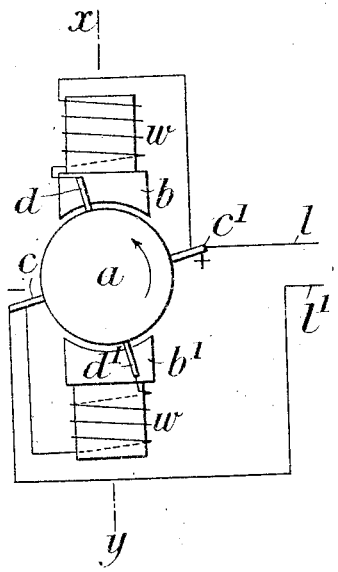

No. 863,410. PATENTED AUG. 13, 1907.
H. LEITNER.
DYNAMO CONSTRUCTION.
APPLICATION FILED JUNE 17, 1905.

Witnesses.

Inventor
Henry Leitner
By Whitaker & Prevost
Attorneys.

UNITED STATES PATENT OFFICE.

HENRY LEITNER, OF MAYBURY, WOKING, ENGLAND.

DYNAMO CONSTRUCTION.

No. 863,410.

Specification of Letters Patent.

Patented Aug. 13, 1907.

Application filed June 17, 1905. Serial No. 265,773.

*To all whom it may concern:*

Be it known that I, HENRY LEITNER, a subject of the King of Great Britain, residing at Maybury, Woking, Surrey, England, have invented new and useful Improvements in Dynamo Construction, of which the following is a specification.

The object of the present invention is mainly to provide a dynamo which in conjunction with a battery of accumulators is adapted to the precise requirements of train lighting, the motive power for the dynamo being derived from the revolution of any axle of the moving train.

The most successful devices of this kind depend for their regulation and for counteracting the effects of varying speed upon a small subsidiary dynamo adapted to control the fields of the main dynamo.

The present invention has the advantage of securing all the effects of the control obtainable from a subsidiary dynamo without the constructional additions involved therein, while having the further advantage of greatly reducing the speed required for the full excitation of the main dynamo and for its maximum output. It also corrects for any ill effects such as sparking due to the distortion of the field.

The invention is applicable to machines of the shunt wound type with two, four, or more poles, but for the sake of simplicity it will be here described in reference only to a two pole machine.

In carrying out the invention in practice we employ in the case of an ordinary two pole shunt wound machine, in addition to the ordinary two brushes for providing the current, two additional brushes arranged at an angle with them, these two brushes providing current which may be termed subsidiary current. The ordinary two brushes of the machine from which the useful current for charging a battery of accumulators, lighting lamps, or other purposes is taken, are arranged with a preferably considerable lead. The subsidiary brushes touching the commutator diametrically opposite to each other are arranged between the two ordinary brushes and a line joining the center of the pole pieces preferably in a line at right angles to the main brushes and therefore the lead of the main brushes determines the angle which the subsidiary brushes make with the line joining the centers of the pole pieces and this is an angle of advance in the direction of rotation. The amount of subsidiary current or subsidiary E. M. F. which the subsidiary brushes furnish depends within limits on their angular distance in the direction of rotation from the said line joining the centers of the pole pieces. The subsidiary brushes above referred to are connected in between the principal brushes of the machine and its shunt field-winding in such a way that when the machine commences to rotate and excites, the E. M. F. from the subsidiary brushes assists in building up the field, but when a certain moderate speed of rotation has been reached it acts against the ordinary brushes of the machine thereby tending to diminish the current flowing through the field-windings and this tendency increases as the speed of rotation increases, the effect being to progressively weaken the field as the speed of driving increases and so keep the output of the machine practically constant within wide limits independently of the speed at which it is driven. The adjustment and the point at which the effect of the E. M. F. of the subsidiary brushes changes from assisting to build up the field to weakening it depends upon their angular distance from the line joining the centers of the pole pieces in the direction of rotation. Instead of employing the opposing E. M. F. of the subsidiary brushes to dam back the current tending to flow through the field-windings we may take an opposing current from the subsidiary brushes round a separate opposing field-winding and thereby weaken the field as the speed of driving increases.

In order that the nature of the invention may be the more fully understood we refer to the accompanying sheet of drawings in which:—

Figure 2:
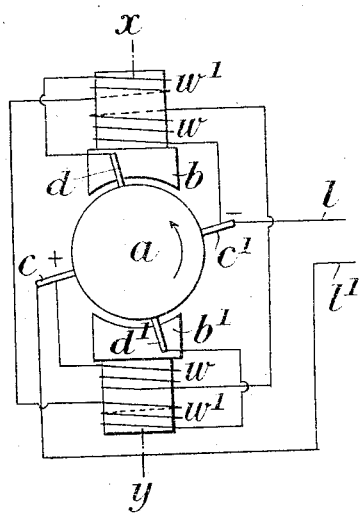
Figure 3:
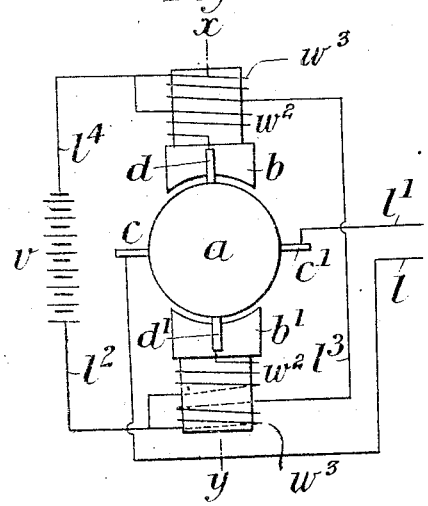

Figure 1 illustrates the principle of the invention applied to an ordinary shunt-wound machine. Fig. 2 illustrates the invention applied to a similar machine the fields magnets of which are provided with a special coil or winding round which the current obtained from the additional or subsidiary brushes is taken. Fig. 3 shows the invention applied to the case of a separately excited machine the arrangements being such that it can be effectively driven in either direction.

In these figures $a$ represents the commutator of a two pole shunt-wound machine of which $b$ and $b^1$ are the two poles of the field magnet.

$c$ and $c^1$ are the ordinary brushes of the machine supplying current to the conductors $l$, $l^1$ which are taken to the battery of accumulators which it is desired the dynamo should charge. $d$, $d^1$ are the subsidiary brushes arranged to press on the commutator $a$ opposite to one another and arranged preferably as shown in a plane between the plane in which the ordinary brushes $c$, $c^1$ are fixed and the plane or line $x$—$y$ bisecting the pole pieces $b$, $b^1$.

$w$ is the ordinary shunt field-winding of the field magnet.

$w^1$ Fig. 2 is the special winding round which the current from the subsidiary brushes $d$, $d^1$ is taken.

Though the parts and windings are shown diagrammatically it will be understood that when the machine is designed to give a constant output independently of the speed at which it is driven, the counter E. M. F. provided b the subsidiary brushes $d$ and $d^1$ first assists and then opposes the tendency of current to flow in the field winding $w$, in the arrangement shown in Fig. 1. Similarly the current which tends to flow in the field winding $w^1$ Fig. 2 connected to the subsidiary brushes $d$ and $d^1$ flows in such a sense as first to assist and then to counteract the magnetizing effect produced by the current flowing in the ordinary winding $w$.

The operation of the arrangements shown will be first described in reference to Fig. 1. The armature and commutator of the machine are supposed to be rotating counter-clockwise in the direction shown by the arrow. By arranging the subsidiary brushes at a suitable angle between the line $x$—$y$ and the line joining the ordinary brushes $c$, $c^1$, as shown in the drawing, the following series of events takes place:—When the machine is slowly rotated and just commences to excite, the polarity of the subsidiary brushes $d$, $d^1$ which should be regarded as the brushes of an independent controlling dynamo is such that the E. M. F. is added to that of the ordinary brushes thereby increasing the initial current flowing in the field-winding $w$. As the speed of rotation on load increases, however, the effective fields of the poles of the field magnets advance in the direction of rotation owing to armature reaction, and the polarity of the subsidiary brushes $d$ and $d^1$ is gradually reversed, their E. M. F. accordingly first sinking to zero and then opposing the current flowing in the field-winding $w$. The greater the speed of rotation thenceforward, the greater counter E. M. F. that is produced by the subsidiary brushes $d$, $d^1$ owing to the angle between them and the poles of the field influencing the armature windings they represent and the output of the machine is in this way kept practically constant or suitable to train requirements independently of the speed at which the armature is driven.

The operation of the arrangement shown in Fig. 2 is entirely similar and equivalent;—when the armature commences to rotate in the direction of the arrow the two subsidiary brushes $d$ and $d^1$ first furnish a current to the winding $w^1$ which assists the magnetizing effect on the field magnets produced by the current flowing in the ordinary field winding $w$. As the speed of rotation increases, however, and the effective polarity acting upon those windings of the armature which are connected to the subsidiary brushes advances in the direction of rotation, the current in the winding $w^1$ first sinks to zero and then reverses. Its effect thenceforth tends to neutralize the magnetic effect produced by the ordinary winding $w$, the demagnetizing current flowing in the winding $w^1$ increasing with the speed of driving and thus keeping the output of the machine constant.

The arrangement shown diagrammatically in Fig. 3 illustrates the application of the invention to the case of a separately excited dynamo, its adoption enabling the machine to be effectively driven in either direction and to generate useful current without the employment of reversing mechanism, or the like. In this figure:— $c$, and $c^1$ are the main brushes of the machine as before. $d$ and $d^1$ are the subsidiary brushes arranged in this case on the line $x$—$y$. $w^3$ $w^3$ are the separately excited field-windings energized from the battery of accumulators $v$ through the conductors $l^2$, $l^3$ and $l^4$. $w^2$, $w^2$ are field-windings also connected to the battery but joined also to the subsidiary brushes $d$, $d^1$ in the manner shown. $l$ and $l^1$ being as before the main current leads of the machine.

When the speed at which the dynamo is driven is small the current from the battery $v$ flows through both windings $w^3$, $w^3$ and $w^2$, $w^2$ the arrangements being such that both strengthen the field, but as the speed increases the counter E. M. F. of the brushes $d$, $d^1$ more and more opposes the accumulator current in $w^2$, $w^2$ and ultimately even overpowers it. In this way the field is suitably weakened as the driving-speed increases and the current from the brushes $c$, $c^1$ is maintained comparatively constant over a wide range of speed. If it is desired to make the machine reversible independent of separate excitation, $l^2$ and $l^4$ are connected to $l$ and $l^1$ or vice versa according to the direction of rotation by suitable change-over mechanism as shown in Fig. 4.

It will be understood that the device shown in Fig. 3 may be varied by disconnecting the windings $w^2$, $w^2$ from $w^3$ and $w^3$ and connecting them together so as to correspond with the arrangement illustrated in Fig. 2.

It will be obvious that the output of the machine as arranged in accordance with two of the figures may likewise be varied by varying the position of the subsidiary brushes $d$, $d^1$, and it is preferable though not absolutely indispensable that the angular distance between the main and subsidiary brushes should be kept constant by mounting them upon the same rocker or by other suitable means. It will also be obvious that further regulation may be obtained by closing the subsidiary brushes $d$, $d^1$ through any suitable (variable) resistance.

It will be plain that the arrangements above described have the effect of providing a dynamo the peculiarities of which are specially suited to the requirements of train lighting, i. e., it excites with ease and rapidity at low speeds and very quickly reaches its maximum output while at more than average speeds the output can be made to decrease to a more or less permanent minimum.

Having now particularly described and ascertained the nature of our said invention and in what manner the same is to be performed, we declare that what we claim is:—

1. In a dynamo, the combination with the electro field magnets, armature and main line brushes, of a pair of fixed subsidiary brushes connected with a winding of the field magnets, the subsidiary brushes being so located and connected that at a low speed of the dynamo they add to the force of the field magnets and at a high speed of the dynamo they lessen the force of the field magnets, substantially as described.

2. In a dynamo, the combination with the electro field magnets, armature and main line brushes, of a shunt of the main line through a winding of the field magnets and subsidiary brushes also connected with a winding of the field magnets, said subsidiary brushes being so located that when the dynamo is running at low speed the current from the said subsidiary brushes adds its force to that of the said shunt circuit, and when the dynamo is running at a high rate of speed opposes the force of the said shunt circuit, substantially as described.

3. In a dynamo, the combination with the electro field magnets, armature and main line brushes, of a shunt from the main line through a winding of the field magnets, and a pair of subsidiary brushes connected with the shunt circuit, the disposition of the said subsidiary brushes being such that when the dynamo is running at a low speed the current of the subsidiary brushes increases the current in the shunt circuit, and when the dynamo is running at a high speed it decreases the current in the shunt circuit, substantially as described.

HENRY LEITNER.

Witnesses.
JOHN E. BOUSFIELD,
C. G. REDFERN.